(12) United States Patent
Hoshuyama (10) Patent No.: US 7,586,640 B2
(45) Date of Patent: Sep. 8, 2009

(54) SIGNAL PROCESSING UNIT

(75) Inventor: Hideo Hoshuyama, Kawasaki (JP)

(73) Assignee: Nikon Corporation, Tokyo (JP)

( * ) Notice: Subject to any disclaimer, the term of this patent is extended or adjusted under 35 U.S.C. 154(b) by 758 days.

(21) Appl. No.: 10/242,356

(22) Filed: Sep. 13, 2002

(65) Prior Publication Data

US 2003/0058466 A1 Mar. 27, 2003

(30) Foreign Application Priority Data

Sep. 21, 2001 (JP) ............................. 2001-288978

(51) Int. Cl.
  G03F 3/00 (2006.01)
  H04N 1/54 (2006.01)
  H04N 1/56 (2006.01)
  H04N 1/60 (2006.01)
  G09G 5/06 (2006.01)
  G06F 17/17 (2006.01)
(52) U.S. Cl. .................. 358/1.9; 358/3.23; 358/518; 358/520; 358/525; 382/162; 382/167; 382/300; 345/601; 345/602; 345/603; 345/604; 345/606; 345/610
(58) Field of Classification Search ............ 358/1.9, 358/3.23, 518, 520, 525; 382/300, 167, 162; 345/604, 606, 610, 601–603
See application file for complete search history.

(56) References Cited

U.S. PATENT DOCUMENTS

| | | | | |
|---|---|---|---|---|
| 5,140,408 A | * | 8/1992 | Kaite et al. | 348/660 |
| 5,172,224 A | * | 12/1992 | Collette et al. | 358/515 |
| 5,453,853 A | * | 9/1995 | Sakai et al. | 358/518 |
| 5,604,610 A | * | 2/1997 | Spaulding et al. | 358/525 |
| 5,659,406 A | * | 8/1997 | Imao et al. | 358/518 |
| 5,717,783 A | * | 2/1998 | Endo et al. | 382/167 |
| 5,805,213 A | * | 9/1998 | Spaulding et al. | 348/222.1 |
| 5,933,256 A | * | 8/1999 | Ebner | 358/520 |
| 5,978,554 A | * | 11/1999 | Hakamada et al. | 358/1.9 |
| 5,987,167 A | * | 11/1999 | Inoue | 382/167 |
| 6,137,494 A | * | 10/2000 | Nin | 345/593 |
| 6,215,561 B1 | * | 4/2001 | Kakutani | 358/1.9 |
| 6,243,059 B1 | * | 6/2001 | Greene et al. | 345/88 |

(Continued)

FOREIGN PATENT DOCUMENTS

JP  A 5-300367  11/1993

(Continued)

*Primary Examiner*—David K Moore
*Assistant Examiner*—Beniyam Menberu
(74) *Attorney, Agent, or Firm*—Oliff & Berridge, PLC (57) ABSTRACT

The invention achieves giving high color reproducibility to a color signal with reliability without substantially increasing circuit scale. A signal processing unit of the invention includes a color transformation part which multiplies an inputted color signal by a transformation matrix and an element setting part setting an element group of the transformation matrix according to every inputted color signal. The element setting part comprises an identification unit identifying a color of the color signal, a storage unit storing in advance optimum element groups for a predetermined number of reference signals, and an interpolation unit. The interpolation unit performs interpolation computing based on the input signal, two optimum element groups for two of the reference signals of colors close to a color of the color signal, and color relation between the color signal and the two reference signals to determine an element group to be set.

3 Claims, 11 Drawing Sheets

U.S. PATENT DOCUMENTS

| | | | | |
|---|---|---|---|---|
| 6,459,449 B1* | 10/2002 | Juen | | 348/223.1 |
| 6,657,746 B1* | 12/2003 | Fuchigami et al. | | 358/1.9 |
| 6,781,595 B2* | 8/2004 | Kobayashi et al. | | 345/589 |
| 6,788,339 B1* | 9/2004 | Ikeda | | 348/223.1 |
| 6,823,083 B1* | 11/2004 | Watanabe et al. | | 382/167 |
| 6,930,809 B1* | 8/2005 | Kagawa et al. | | 358/518 |
| 6,947,594 B2* | 9/2005 | Watanabe et al. | | 382/167 |
| 6,950,109 B2* | 9/2005 | Deering | | 345/589 |
| 6,995,865 B1* | 2/2006 | Motomura | | 358/1.9 |
| 7,072,510 B2* | 7/2006 | Pettigrew | | 382/167 |
| 7,177,465 B1* | 2/2007 | Takahira | | 382/166 |
| 2001/0015835 A1* | 8/2001 | Aoki | | 358/525 |
| 2001/0026372 A1* | 10/2001 | Misawa | | 358/1.9 |
| 2001/0043368 A1* | 11/2001 | Morikawa | | 358/458 |
| 2002/0025069 A1* | 2/2002 | Endo et al. | | 382/167 |
| 2003/0053095 A1* | 3/2003 | Nakami | | 358/1.9 |

FOREIGN PATENT DOCUMENTS

| | | |
|---|---|---|
| JP | A 6-6587 | 1/1994 |
| JP | 10-164381 * | 6/1998 |

* cited by examiner

$$M(i) = \begin{pmatrix} m11(i) & m12(i) \\ m21(i) & m22(i) \end{pmatrix}$$

NOTE THAT M(i + 1) = M(0) WHEN i = 15, NAMELY, $$m11(i+1) = m11(0)$$
$$m12(i+1) = m12(0)$$
$$m21(i+1) = m21(0)$$
$$m22(i+1) = m22(0)$$

FIG.5

| | | |
|---|---|---|
| 0 | m11(0),m12(0),m21(0),m22(0), | m11(1),m12(1),m21(1),m22(1) |
| 1 | m11(1),m12(1),m21(1),m22(1), | m11(2),m12(2),m21(2),m22(2) |
| 2 | m11(2),m12(2),m21(2),m22(2), | m11(3),m12(3),m21(3),m22(3) |
| 3 | m11(3),m12(3),m21(3),m22(3), | m11(4),m12(4),m21(4),m22(4) |
| 4 | m11(4),m12(4),m21(4),m22(4), | m11(5),m12(5),m21(5),m22(5) |
| 5 | m11(5),m12(5),m21(5),m22(5), | m11(6),m12(6),m21(6),m22(6) |
| 6 | m11(6),m12(6),m21(6),m22(6), | m11(7),m12(7),m21(7),m22(7) |
| 7 | m11(7),m12(7),m21(7),m22(7), | m11(8),m12(8),m21(8),m22(8) |
| 8 | m11(8),m12(8),m21(8),m22(8), | m11(9),m12(9),m21(9),m22(9) |
| 9 | m11(9),m12(9),m21(9),m22(9), | m11(10),m12(10),m21(10),m22(10) |
| 10 | m11(10),m12(10),m21(10),m22(10), | m11(11),m12(11),m21(11),m22(11) |
| 11 | m11(11),m12(11),m21(11),m22(11), | m11(12),m12(12),m21(12),m22(12) |
| 12 | m11(12),m12(12),m21(12),m22(12), | m11(13),m12(13),m21(13),m22(13) |
| 13 | m11(13),m12(13),m21(13),m22(13), | m11(14),m12(14),m21(14),m22(14) |
| 14 | m11(14),m12(14),m21(14),m22(14), | m11(15),m12(15),m21(15),m22(15) |
| 15 | m11(15),m12(15),m21(15),m22(15), | m11(0),m12(0),m21(0),m22(0) |

NOTE THAT M(i + 1) = M(0) AND d(i + 1) = d(0)
WHEN i = 15

FIG.10

| | | | |
|---|---|---|---|
| 0 | m11(0),m12(0),m21(0),m22(0), | m11(1),m12(1),m21(1),m22(1), | d(0),d(1) |
| 1 | m11(1),m12(1),m21(1),m22(1), | m11(2),m12(2),m21(2),m22(2), | d(1),d(2) |
| 2 | m11(2),m12(2),m21(2),m22(2), | m11(3),m12(3),m21(3),m22(3), | d(2),d(3) |
| 3 | m11(3),m12(3),m21(3),m22(3), | m11(4),m12(4),m21(4),m22(4), | d(3),d(4) |
| 4 | m11(4),m12(4),m21(4),m22(4), | m11(5),m12(5),m21(5),m22(5), | d(4),d(5) |
| 5 | m11(5),m12(5),m21(5),m22(5), | m11(6),m12(6),m21(6),m22(6), | d(5),d(6) |
| 6 | m11(6),m12(6),m21(6),m22(6), | m11(7),m12(7),m21(7),m22(7), | d(6),d(7) |
| 7 | m11(7),m12(7),m21(7),m22(7), | m11(8),m12(8),m21(8),m22(8), | d(7),d(8) |
| 8 | m11(8),m12(8),m21(8),m22(8), | m11(9),m12(9),m21(9),m22(9), | d(8),d(9) |
| 9 | m11(9),m12(9),m21(9),m22(9), | m11(10),m12(10),m21(10),m22(10), | d(9),d(10) |
| 10 | m11(10),m12(10),m21(10),m22(10), | m11(11),m12(11),m21(11),m22(11), | d(10),d(11) |
| 11 | m11(11),m12(11),m21(11),m22(11), | m11(12),m12(12),m21(12),m22(12), | d(11),d(12) |
| 12 | m11(12),m12(12),m21(12),m22(12), | m11(13),m12(13),m21(13),m22(13), | d(12),d(13) |
| 13 | m11(13),m12(13),m21(13),m22(13), | m11(14),m12(14),m21(14),m22(14), | d(13),d(14) |
| 14 | m11(14),m12(14),m21(14),m22(14), | m11(15),m12(15),m21(15),m22(15), | d(14),d(15) |
| 15 | m11(15),m12(15),m21(15),m22(15), | m11(0),m12(0),m21(0),m22(0), | d(15),d(0) |

FIG. 11

SIGNAL PROCESSING UNIT

BACKGROUND OF THE INVENTION

1. Field of the Invention

The present invention relates to a signal processing unit applied to a color image device such as an electronic camera, a video camera, a scanner, and a printer, and more particularly, to a signal processing unit for performing color transformation processing or brightness correction processing on each color signal obtained by the color image device.

2. Description of the Related Art

A color transformation circuit is generally mounted on a color image device in order to give a good color reproducibility to a color signal. The color transformation circuit performs color transformation processing on the color signal according to an input/output characteristic peculiar to the color image device.

Note that the word 'color' is used in this specification to mean information consisting of hue, brightness, and chroma.

Incidentally, some of the color transformation circuits perform color system transformation of image data as well as color correction.

The color transformation circuits are mainly classified into a lookup table circuit often used in scanners, printers, and the like and a color matrix circuit often used in electronic cameras, video cameras, and the like.

The lookup table circuit stores color signals (R', G', B') which are obtained after color signals (R, G, B) for respective colors are transformed. The lookup table circuit is able to perform not only linear color transformation processing (=first-order color transformation processing) but also non-linear color transformation processing (=high-order color transformation processing) and is able to set a characteristic curve (color transformation characteristic curve) of the color transformation processing to an optimum one according to the input/output characteristic peculiar to the color image device.

Therefore, the lookup table circuit gives a high color reproducibility to the color signal so that images on a reproduced image are expressed with optimum colors. The lookup table circuit, however, has a disadvantage that it has a large circuit scale due to a large amount of information stored therein.

On the other hand, the color matrix circuit stores a transformation expression (generally, a first-order transformation matrix of 3×3) common to the color signals (R, G, B) for the respective colors. Therefore, the color matrix circuit is able to perform only the linear color transformation processing so that the color transformation characteristic curve can be set to an approximate line, but not to an optimum curve.

Hence, the color matrix circuit cannot give the high color reproducibility to the color signal so that images on a reproduced image are not always expressed with the optimum colors. The color matrix circuit, however, has an advantage that its circuit scale is small owing to small amount of information stored therein and its simple arithmetic operation.

It is possible to set the color transformation characteristic curve to a quadratic curve or a cubic curve by increasing the order of the color transformation processing of the color matrix circuit. The size of the transformation matrix, however, will become '3×9' when the order of the color transformation processing is increased by, for example, one in order to set its color transformation characteristic curve to the quadratic curve. In addition, in this case generation of vectors ($R^2$, $G^2$, $B^2$, RG, GB, BR, R, G, B) increases the necessary number of times of multiplications/divisions by as many as '24' times. Accordingly, to set the color transformation characteristic curve to a high-order curve such as the cubic curve and a quartic curve by using the color matrix circuit, the circuit scale has to be greatly increased.

To solve these problems, a color matrix circuit as disclosed in, for example, Japanese Unexamined Patent Publication Application Nos. Hei 6-6587 and Hei 5-300367 has been conventionally proposed.

In this color matrix circuit, the order of the color transformation processing is '1', but a plurality of element groups of the transformation matrix is prepared in advance. In the color matrix circuit, any of the element groups is selectively used in conformity with to a color range to which a color signal to be transformed belongs. This enables the color transformation characteristic curve to be a stair-shaped line. In other words, in this color matrix circuit the color transformation characteristic curve can approximate to the optimum with reduction in its circuit scale.

According to this color matrix circuit, however, a contour which does not exist in an actual image (a pseudo-contour) and noise may occur on a reproduced image. The reason is as follows.

In general, color change in a certain image is often continuous. If the image belongs to two different color ranges, however, this color matrix circuit performs two different color transformation processings between on a part of the image belonging to one of the two color ranges and on the other part of the image belonging to the other color range. As a result, originally continuous color change in the image becomes discontinuous in the reproduced image.

This problem is not solved even when the number of the element groups prepared in the color matrix circuit is increased. This is because the increase in the number of the element groups increases the number of steps of the color transformation characteristic curve (here, a stair-shaped line), but a level difference between steps still remains.

According to the color matrix circuit in Japanese Unexamined Patent Publication Application No. Hei 6-6587, this level difference among the steps of the color transformation characteristic curve is reduced so that the occurrence of the pseudo-contour can be prevented, but this color matrix circuit may possibly lower the color reproducibility of a certain color image device.

For example, in a color image device using a CCD image sensor for complementary colors, a 'steeply changing curve' is the optimum color transformation characteristic curve. In this case, the reduction in the level difference among the steps of the color transformation characteristic curve will result in divergence from the optimum one.

SUMMARY OF THE INVENTION

In view of the above, it is an object of the present invention to provide a signal processing unit which can surely give high color reproducibility to a color signal without any great increase in its circuit scale.

In order to attain this object, a signal processing unit of the present invention comprises: a color transformation part which performs color transformation processing on an inputted color signal by multiplying the color signal by a transformation matrix; and an element setting part which sets, every time a color signal is inputted, an element group of the transformation matrix according to the color signal. The element setting part comprises: an identification unit which identifies a color of the inputted color signal; a storage unit which stores in advance an optimum element group for each of a predetermined number of color reference signals, and an interpolation unit. The interpolation unit recognizes optimum element groups for two of the color reference signals of colors close to a color of the inputted color signal, referring to the storage unit according to an identification result, and performs interpolation computing based on a color relation between the inputted color signal and the two color reference signals and on the optimum element groups for the two color reference signals to determine the aforesaid element group to be set.

A color transformation characteristic curve can approximate to optimum by this interpolation computing. In other words, the color signal is surely given high color reproducibility without substantial increase in the circuit scale.

Preferably, in the signal processing unit, the storage unit has a lookup table in which an argument of the lookup table indicates a color range to which the color signal belongs and a function of the lookup table indicates optimum element groups for the two color reference signals located on borders of the color range. Further, in the signal processing unit, the element setting part preferably uses hue as a physical value indicating the aforesaid color. It is preferable that in the signal processing unit, the element setting part arranges the predetermined number of the color reference signals with uneven intervals in a hue space.

Further, in order to attain the above-described object, a signal processing unit of the present invention comprises: a brightness correction part which performs brightness correction processing on an inputted color signal; and a correction value setting part which sets, every time a color signal is inputted, a correction value of the brightness correction processing according to the color signal. The correction value setting part comprises; an identification unit which identifies a color of the inputted color signal; a storage unit which stores in advance optimum correction values for a predetermined number of color reference signals, and an interpolation unit. The interpolation unit recognizes optimum correction values for two of the color reference signals of colors close to a color of the inputted color signal, referring to the storage unit according to a result of the identification, and performs interpolation computing based on a color relation between the inputted color signal and the two color reference signals and on the optimum correction values of the two color reference signals to determine the aforesaid correction value to be set.

This allows a brightness correction characteristic curve to approximate to optimum. In other words, the color signal is surely given high color reproducibility without any great increase in the circuit scale.

Preferably, in the signal processing unit, the storage unit has a lookup table in which an argument of the lookup table represents a color range to which the color signal belongs, and a function of the lookup table represents the optimum correction values for the two color reference signals located on borders of the color range.

Further, in the signal processing unit, the correction value setting part preferably uses hue as a physical value indicating the aforesaid color. It is also preferable that in the signal processing unit, the correction value setting part arranges the predetermined number of color reference signals with uneven intervals in a hue space.

According to the present invention described above, a signal processing unit which can surely give high color reproducibility to a color signal is realized without any great increase in its circuit scale.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Embodiments of the present invention will be explained hereunder with reference to the drawings.

First Embodiment

A first embodiment of the present invention will be explained with reference to FIG. 1, FIG. 2, FIG. 3, FIG. 4, FIG. 5, and FIG. 6.

The inventor of the present invention has used a color matrix circuit in order to prevent a great increase in its circuit scale and prepared plural element groups for the color matrix circuit.

The inventor of the present invention has thought of setting a color transformation characteristic curve not to be 'a stair-shaped line' but to be 'a polygonal line' through the use of this color matrix circuit.

When the curve is a polygonal line, a pseudo-contour and noise occurring on a reproduced image are prevented. Moreover, the color transformation characteristic curve can approximate to optimum.

Note that a signal processing unit of the present invention in a case when it is mounted inside an electronic camera as a part of its circuit will be explained in this embodiment.

Figure 1:
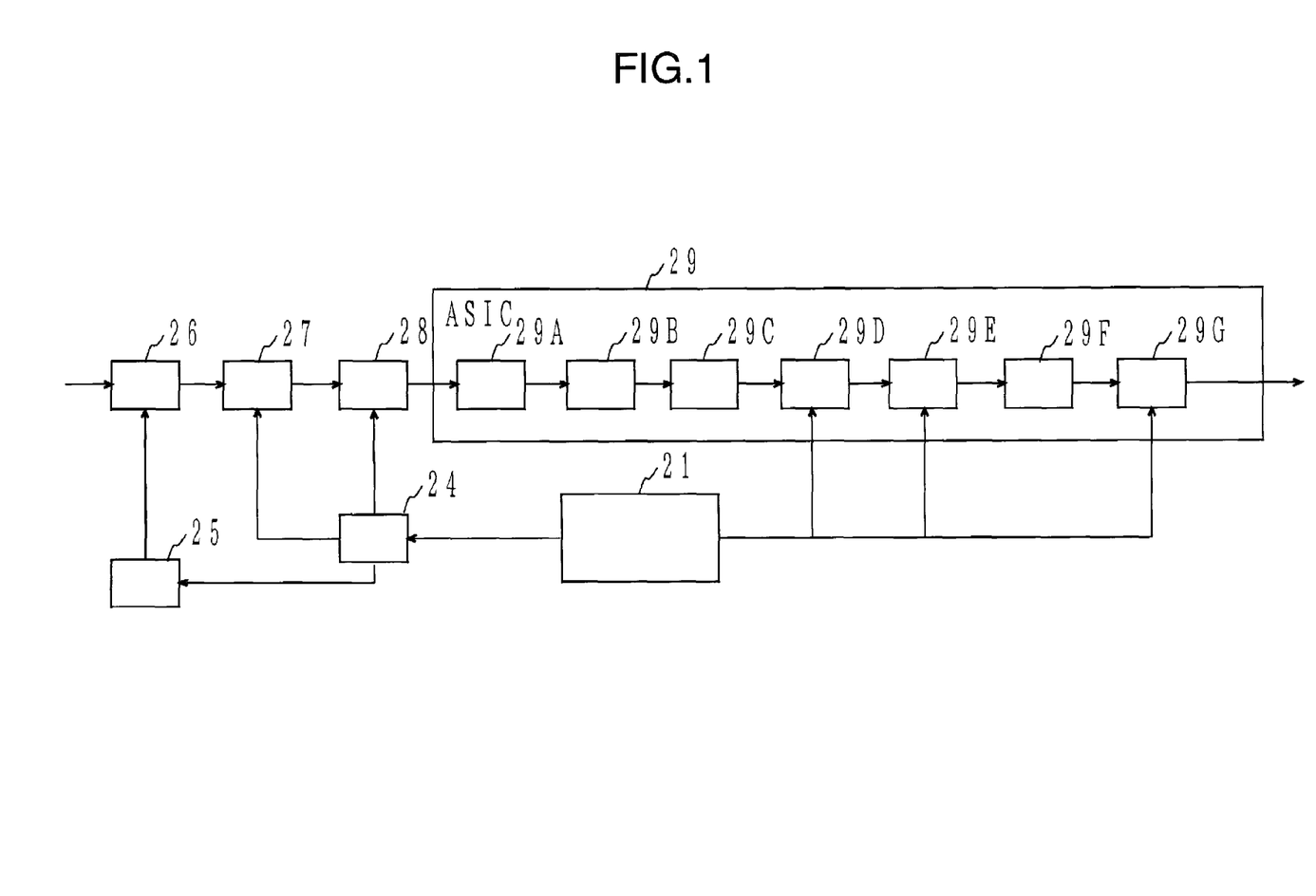
FIG. 1 is a circuit block diagram inside an electronic camera of a first embodiment.

FIG. 1 is a circuit block diagram inside the electronic camera of this embodiment.

The electronic camera is provided with a CPU 21, a CCD image sensor 26, a driver circuit 25, an analog signal processing circuit 27, an A-D converter 28, a signal processing circuit 29 (for example, constituted as ASIC), and so on.

The driver circuit 25 drives the CCD image sensor 26 and the CCD image sensor 26 picks up an image of a photographic subject. Further, the analog signal processing circuit 27, the A-D converter 28, the signal processing circuit 29, and so on perform respective processings on a signal outputted from the CCD image sensor 26.

The signal processing circuit 29 is provided with a defect correction circuit 29A, a digital clamp circuit 29B, a gain adjustment circuit 29C, a white balance adjustment circuit 29D, a γ correction circuit 29E, a color interpolation circuit 29F, and a color matrix circuit 29G (corresponding to a signal processing unit and a color transformation part in claims).

The driver circuit 25, the analog signal processing circuit 27, and the A-D converter 28 are controlled by the CPU 21 via a timing generator 24. Further, the white balance adjustment circuit 29D, the γ correction circuit 29E, the color interpolation circuit 29F, and the color matrix circuit 29G inside the signal processing circuit 29 are also controlled by the CPU 21.

The color signal outputted from the CCD image sensor 26 is converted to a digital signal via the analog signal processing circuit 27 and the A-D converter 28 and inputted to the signal processing circuit 29.

The defect correction circuit 29A inside the signal processing circuit 29 generates a color signal corresponding to a defective color of the CCD image sensor 26 based on the color signal outputted by the A-D converter 28.

Each color signal undergoes DC reproduction processing in the digital clamp circuit 29B, color (white level) balance adjustment in the white balance adjustment circuit 29D, predetermined tone conversion processing according to the characteristic of a monitor (an exterior or an interior monitor of the electronic camera) in the γ correction circuit 29E, color interpolation processing in the color interpolation circuit 29F, and color transformation processing (to be detailed later) in the color matrix circuit 29G.

It should be noted that each of the above-described processing in the signal processing circuit 29 of this embodiment is not necessarily performed in the order mentioned above. But, at least the processing in the color matrix circuit 29G is performed on a stage subsequent at least to the processing in the color interpolation circuit 29F.

Figure 2:
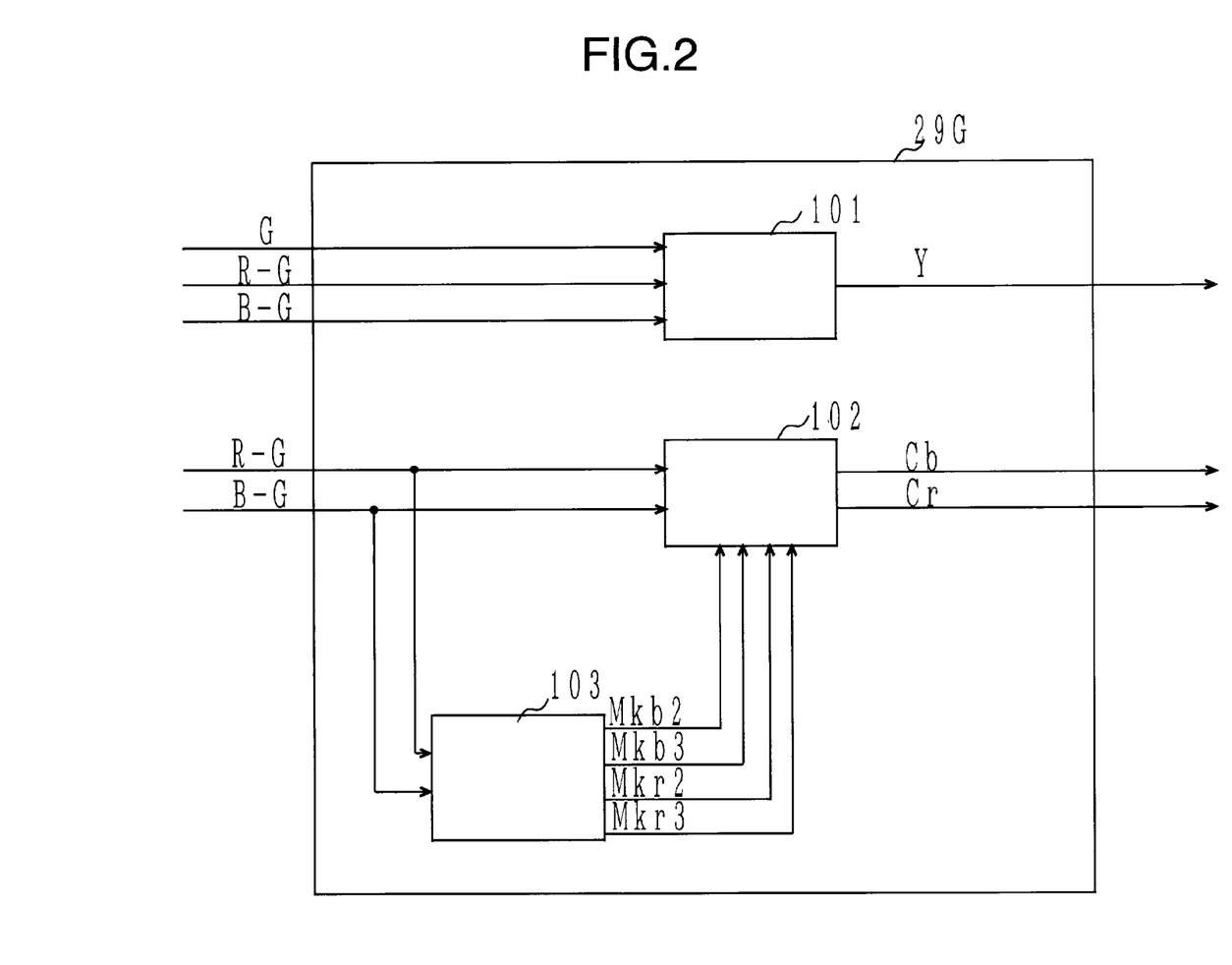
FIG. 2 is a circuit block diagram inside a color matrix circuit 29G.

FIG. 2 is a circuit block diagram inside the color matrix circuit 29G.

The explanation hereunder will be made on the case where a color system of a color signal on an input side (hereinafter, referred to as an 'input color signal') is an 'RGB color system' and a color system of a color signal on an output side (hereinafter, referred to as an 'output color signal') is a 'YCbCr color system'. Incidentally, other color systems may be used as the color system of the input color signal and the color system of the output color signal.

Since the color system of the output color signal is the YCbCr color system, the color matrix circuit 29G is provided with a matrix circuit 101 for generating a brightness signal Y and a matrix circuit 102 for generating color difference signals (Cb, Cr).

The matrix circuit 101 multiplies the inputted color signal (R, G, B) by a transformation matrix of 1×3 as in the following expression (1).

$$Y = (Mkg1 \ Mkb1 \ Mkr1) \begin{pmatrix} G \\ B-G \\ R-G \end{pmatrix} \quad (1)$$

Note that elements (Mkg1, Mkb1, Mkr1) are constants in this embodiment.

The matrix circuit 102 multiplies the inputted color signal (R, G, B) by a transformation matrix of 2×2 as in the following expression (2).

$$\begin{pmatrix} Cr \\ Cb \end{pmatrix} = \begin{pmatrix} Mkr2 & Mkb2 \\ Mkr3 & Mkb3 \end{pmatrix} \begin{pmatrix} R-G \\ B-G \end{pmatrix} \quad (2)$$

FIG. 2 shows that signals inputted to the matrix circuit 101 are G, (R−G), and (B−G), and signals inputted to the matrix circuit 102 are (R−G) and (B−G), but the differences (R−G) and (B−G) may be calculated either on a stage preceding to the color matrix circuit 29G or inside the color matrix circuit 29G.

In the color matrix circuit 29G of this embodiment, an element group (Mkr2, Mkb2, Mkr3, Mkb3) of the transformation matrix is generated each time the input color signal (R, G, B) is inputted. This is generated by a parameter generating part 103 (corresponding to an element setting part in claims).

Figure 3:
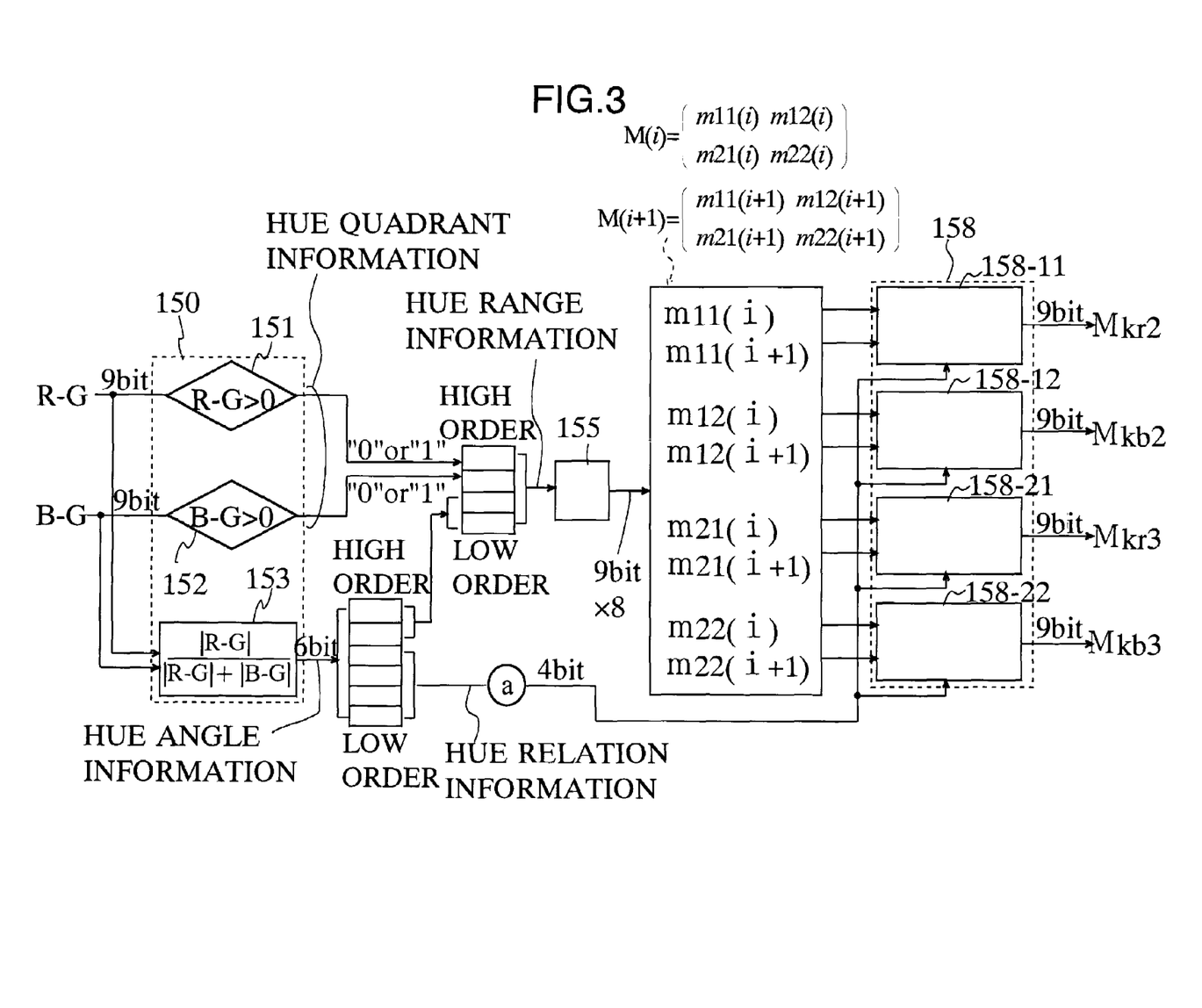
FIG. 3 is a circuit block diagram inside a parameter generating part 103.

FIG. 3 is a circuit block diagram inside the parameter generating part 103.

The parameter generating part 103 is provided with an identification circuit 150 (corresponding to an identification unit in claims), a lookup table 155 (corresponding to a storage unit), and an interpolation circuit 158.

The identification circuit 150 identifies the hue of the input color signal.

The lookup table 155 stores in advance optimum element groups M(0), ..., M(15) respectively for the predetermined number of color reference signals whose hues are different from one another.

The interpolation circuit 158 refers to the identified hue and obtains from the lookup table 155 the optimum element groups M(i), M(i+1) for two of the color reference signals whose hues are close to that of the input color signal. Further, the interpolation circuit 158 performs interpolation computing based on the obtained optimum element groups M(i), M(i+1) to calculate the element group (Mkr2, Mkb2, Mkr3, Mkb3) to be set.

Detailed explanation will be given below.

Figure 4:
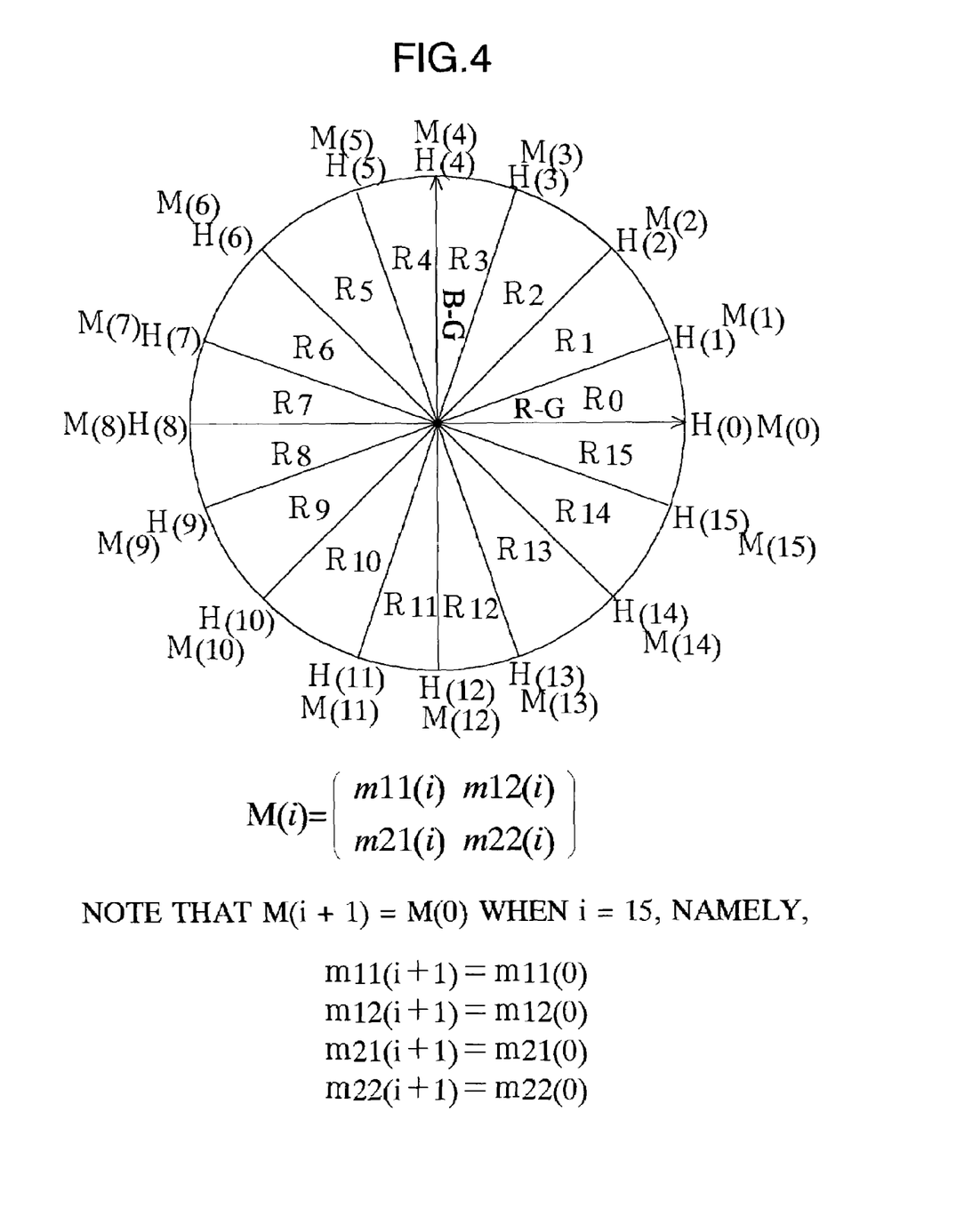
FIG. 4 is a view showing hues of respective color reference signals in a hue space and optimum element groups of the respective color reference signals.

The identification circuit 150 is composed of comparators 151, 152 and a hue angle arithmetic circuit 153. The comparators 151, 152 generate information indicating a quadrant, among four quadrants of a hue space as shown in FIG. 4, for example, to which the hue of the input color signal belongs (hereinafter, referred to as 'hue quadrant information' and expressed with 2 bits). The hue angle arithmetic circuit 153 generates information indicating a hue angle of the input color signal (hereinafter, referred to as 'hue angle information' and expressed with 6 bits). In short, the hue of the input color signal is expressed by the hue quadrant information of 2 bits and the hue angle information of 6 bits.

Note that the hue angle arithmetic circuit 153 of this embodiment generates the hue angle information by the following expression (3).

$$\frac{|R-G|}{|R-G|+|B-G|} \quad (3)$$

This expression (3) is an approximate expression of an expression for calculating the hue angle. This expression (3) is advantageous in that a great increase in the circuit scale of the parameter generating part 103 is not necessary since it includes only one multiplication/division (incidentally, an expression for calculating an accurate hue angle needs a trigonometric function).

Then, this hue quadrant information (2 bits) and high-order 2 bits of the hue angle information (6 bits) are inputted to the lookup table 155. The high-order 2 bits of this hue angle information indicate a hue range to which the input color signal belongs, out of four different hue ranges in the quadrant shown in FIG. 4. Therefore, the high-order 2 bits of the hue angle information and the four bits of the hue quadrant information (i) indicate the hue range, among 16 different hue ranges R(i) (i=0, . . . , 15) of the hue space shown in FIG. 4, to which the input color signal belongs (hereinafter, information indicating the hue range R(i) to which this input color signal belongs is referred to as 'hue range information').

As shown in FIG. 4, the optimum element groups M(0), . . . , M(15) which are stored in the lookup table 155 are the optimum element groups for the respective color reference signals located on the borders (hues H(0), . . . , H(15)) of these hue ranges R0, . . . , R15. Note that each of the optimum element groups M(0), . . . , M(15) can be obtained from an input/output characteristic or the like of the CCD image sensor 26. Further, each of the optimum element groups M(0), . . . , M(15) can be also obtained, for example, in the following manner.

It is obtained by imaging color samples of the respective hues H(0), . . . , H(15) on trial with the electronic camera to evaluate on how much hues of obtained color signals differ from those of the color samples.

Further, hereunder, out of the elements constituting the optimum element group M(i), one corresponding to the element Mkr2 of the transformation matrix (the expression (2)) is substituted by m11(i), one corresponding to the element Mkb2 is substituted by m12(i), one corresponding to the element Mkr3 is substituted by m21(i), and one corresponding to the element Mkb3 is substituted by m22(i).

Figure 5:
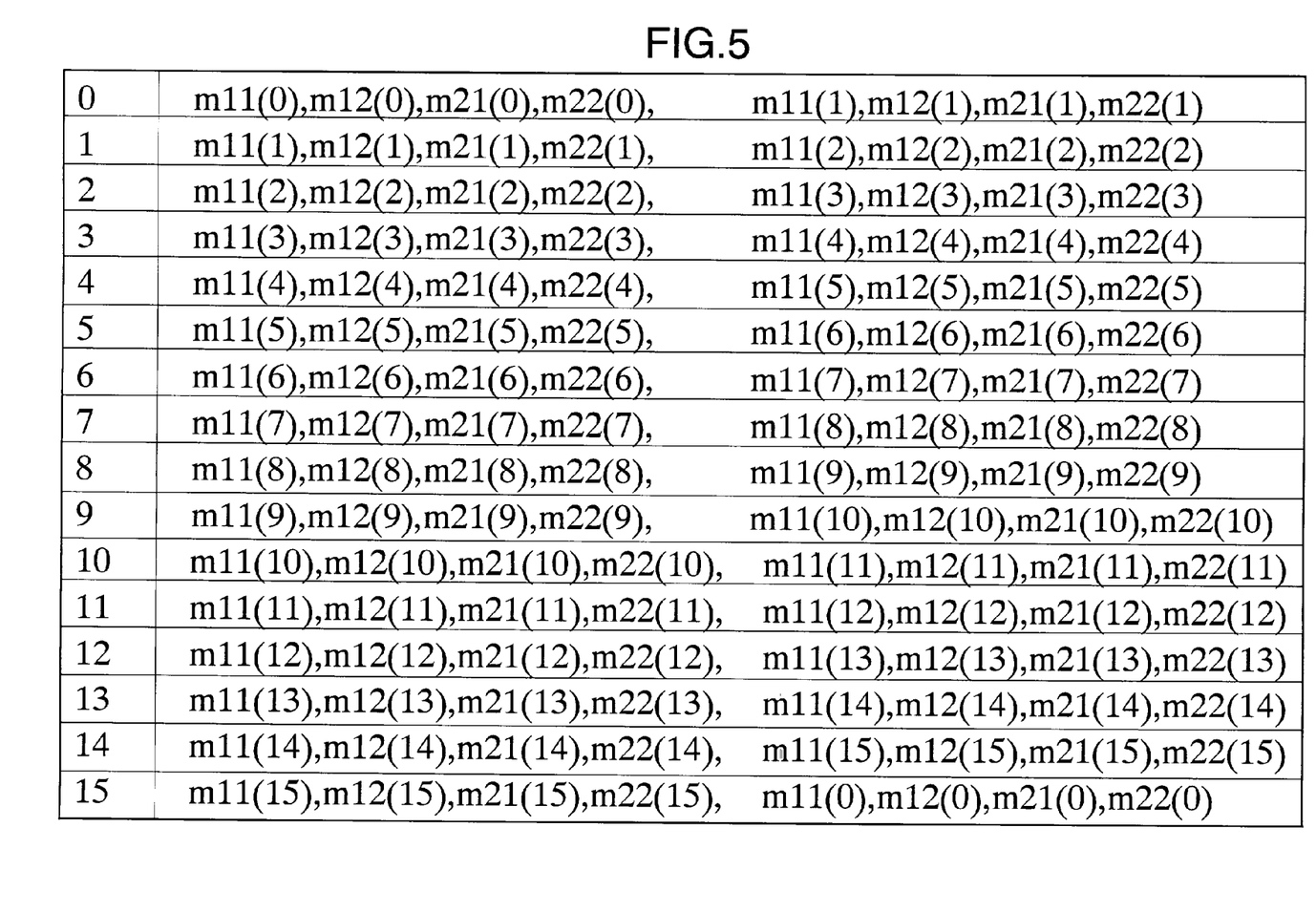
FIG. 5 is a view showing the contents of a lookup table 155.

FIG. 5 is a view showing the contents of the lookup table 155.

The optimum element group M(i) (i=0, . . . , 15) corresponds to the hue range information (i) (i=0, . . . , 15) in the lookup table 155. The elements of the optimum element group M(i) and the elements of its adjacent optimum element group M(i+1) correspond to each piece of the hue range information (i) (note that M(i+1)=M(0) when i=15). In other words, in the lookup table 155, 8 values, m11(i), m12(i), m21(i), m22(i), m11(i+1), m12(i+1), m21(i+1), m22(i+1), are stored in correspondence with each piece of the hue range information (i) (i=0, . . . , 15) (note that m11(i+1)=m11(0), m12(i+1)=m12(0), m21(i+1)=m21(0), and m22(i+1)=m22(0) when i=15).

Figure 6:
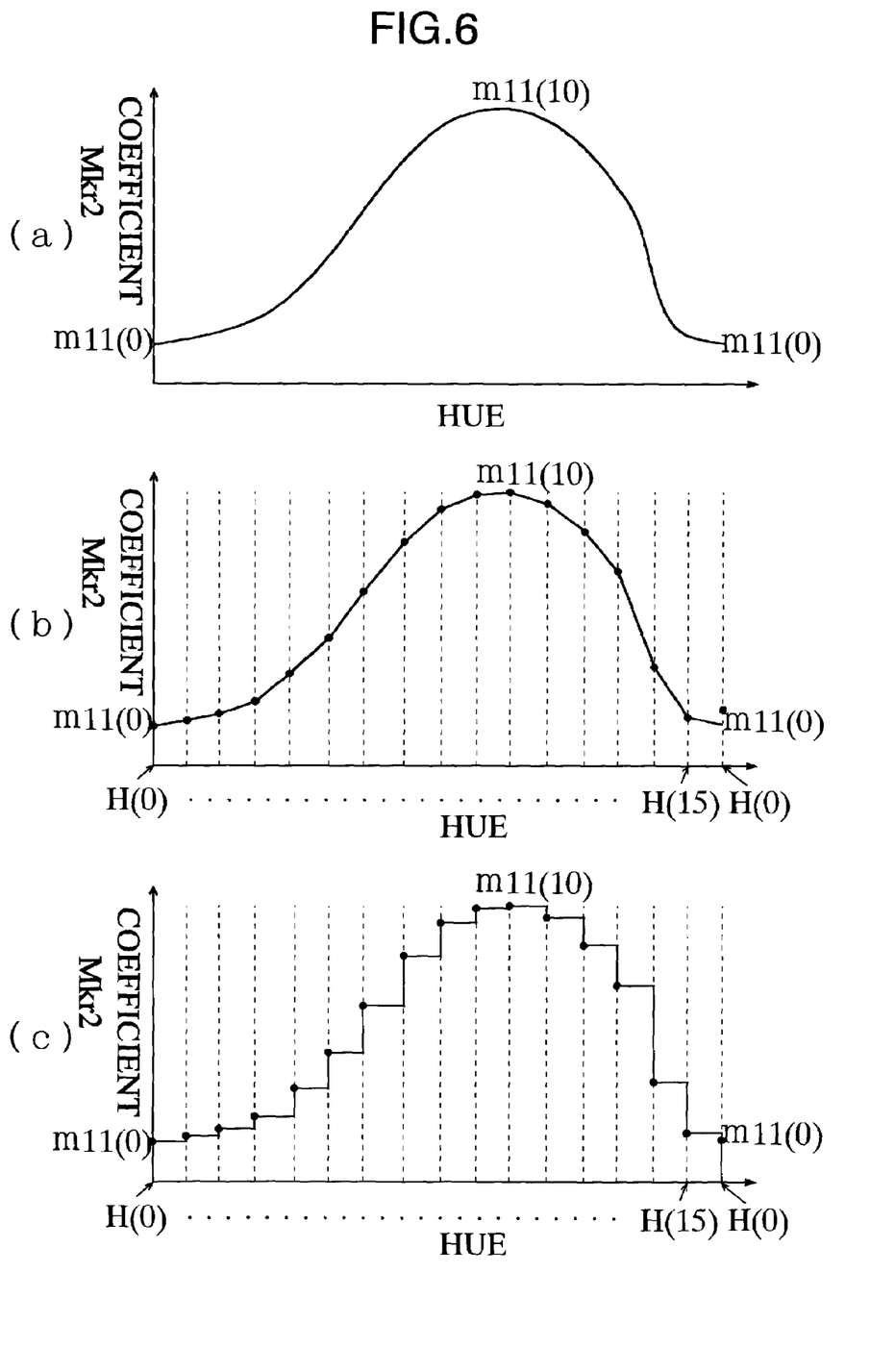
FIG. 6(a), FIG. 6(b), and FIG. 6(c) are views explaining interpolation computing by an interpolation circuit 158.

FIG. 6(*b*) is a view explaining interpolation computing by the interpolation circuit 158.

In FIG. 6(*b*), the horizontal axis indicates the hue of the input color signal and the vertical axis indicates a set value of the element Mkr2. Incidentally, the values on the vertical axis and the horizontal axis are not significant in FIG. 6(*b*).

Further, 'relation among the element Mkr2, an interpolation circuit $158_{-11}$, and the element m11', to be described later, also applies to 'relation among the element Mkb2, an interpolation circuit $158_{-12}$, and the element m12', 'relation among the element Mkr3, an interpolation circuit $158_{-21}$, and the element m21', and 'relation among the element Mkb3, an interpolation circuit $158_{-22}$, and the element m22'.

When the interpolation circuit $158_{-11}$ recognizes the hue range information (i) (indicating the hue range Ri to which the input color signal belongs), it refers to the optimum element groups M(i), M(i+1) which are stored in the lookup table 155 and correspond to this hue range information (i). Then, the interpolation circuit $158_{-11}$ performs the interpolation computing based on the two elements corresponding to the element Mkr2 (namely, the elements m11(i) and m11(i+1)) out of the elements in the optimum element groups M(i), M(i+1), to calculate the element Mkr2.

The interpolation circuit $158_{-11}$ allows the relation between the hue of the input color signal and the hues H(i), H(i+1) of two color reference signals having close colors to the color signal (hereinafter, referred to as 'hue relation information) to be reflected in this interpolation computing. This hue relation information (a) corresponds to low-order 4 bits of the aforesaid hue angle information (refer to FIG. 3). For example, the interpolation circuit 158 calculates a weighted average of m11(i) and m11(i+1) according to this hue relation information (a) as in the following expression (4).

$$Mkr2 = \frac{m11(i) \times (16-a) + m11(i+1) \times a}{16} \quad (4)$$

Therefore, in this embodiment, a color transformation characteristic curve approximates an optimum one. Incidentally, the above expression (4) is a linear interpolation expression which is the simplest among various kinds of interpolation computing. Using the interpolation circuit $158_{-11}$ which performs such interpolation computing, the color transformation characteristic curve becomes a polygonal line as is apparent from FIG. 6(*b*).

An expression (5), an expression (6), and an expression (7) can be used for the expressions for the interpolation computing in the interpolation circuit $158_{-12}$ which calculates the element Mkb2, in the interpolation circuit $158_{-21}$ which calculates the element Mkr3, and in the interpolation circuit $158_{-22}$ which calculates the element Mkb3, respectively.

$$Mkb2 = \frac{m12(i) \times (16-a) + m12(i+1) \times a}{16} \quad (5)$$

$$Mkr3 = \frac{m21(i) \times (16-a) + m21(i+1) \times a}{16} \quad (6)$$

$$Mkb3 = \frac{m22(i) \times (16-a) + m22(i+1) \times a}{16} \quad (7)$$

FIG. 6(*a*) shows an optimum color transformation characteristic curve and FIG. 6(*c*) shows a color transformation characteristic curve set by the prior art (in which the element group is selectively used). In FIG. 6(*a*), FIG. 6(*b*), and FIG. 6(*c*), the number of the optimum element groups M(i) prepared in advance is assumed to be the same in this embodiment (FIG. 6(*b*)) as in the prior art (FIG. 6(*c*)) for simple comparison.

It is seen that the color transformation characteristic curve set in this embodiment (FIG. 6(*b*)) approximates the optimum one (FIG. 6(*a*)) to a greater extent than the color transformation characteristic curve set in the prior art (FIG. 6(*c*)) does.

Further, in this embodiment described above, circuits necessary for the interpolation computing are the hue angle arithmetic circuit 153 and the interpolation circuits $158_{-11}$, $158_{-12}$, $158_{-21}$, and $158_{-22}$. The increase in the circuit scale (the number of multiplication/division+9) in this embodiment is, however, remarkably small compared with the increase (the number of multiplication/division+24) in the circuit scale in the case where the order of the color transformation is increased to 2 in the prior art.

Moreover, the color transformation characteristic curve can approximate a higher-order curve such as a cubic curve and a quartic curve to a greater extent when the color transformation characteristic curve becomes the polygonal line by performing the interpolation computing as in this embodiment than when the color transformation characteristic curve becomes a quadratic curve by increasing the order of the color transformation to 2 as in the prior art. Therefore, a color reproducibility obtained in this embodiment is made higher than that obtained in the prior art where the order of the color transformation is increased to 2. In conclusion, according to this embodiment, a high color reproducibility can be surely given to the color signal without any great increase in the circuit scale.

The following expression (8) may replace the expression (3) as the arithmetic expression of the hue angle information used by the hue angle arithmetic circuit 153 in this embodiment.

$$\frac{(R-G)^2}{(R-G)^2+(B-G)^2} \quad (8)$$

According to this expression (8), the division density of the hue space (namely, the size of the hue ranges R0, . . . , R15) shown in FIG. 4 and FIG. 6 becomes uneven depending on colors. Also, humans' color perception and the characteristics peculiar to the color image device naturally have unevenness depending on colors, therefore, the color transformation processing should have the unevenness, too. In other words the accuracy of the color transformation processing is required to be high or is allowed to be low, depending on a position in the hue space to which the input color signal belongs.

Therefore, it is preferable that as a result of using this expression (8), the division density of an area in which the accuracy of the color transformation processing is required to be high is high and the division density of an area in which the accuracy of the color transformation processing is allowed to be low is low, in the hue space. In this case, a more appropriate color transformation characteristic curve can be set, thereby realizing an efficient circuit configuration.

Second Embodiment

A second embodiment of the present invention will be explained with reference to FIG. 7, FIG. 8, FIG. 9, and FIG. 10.

Figure 7:
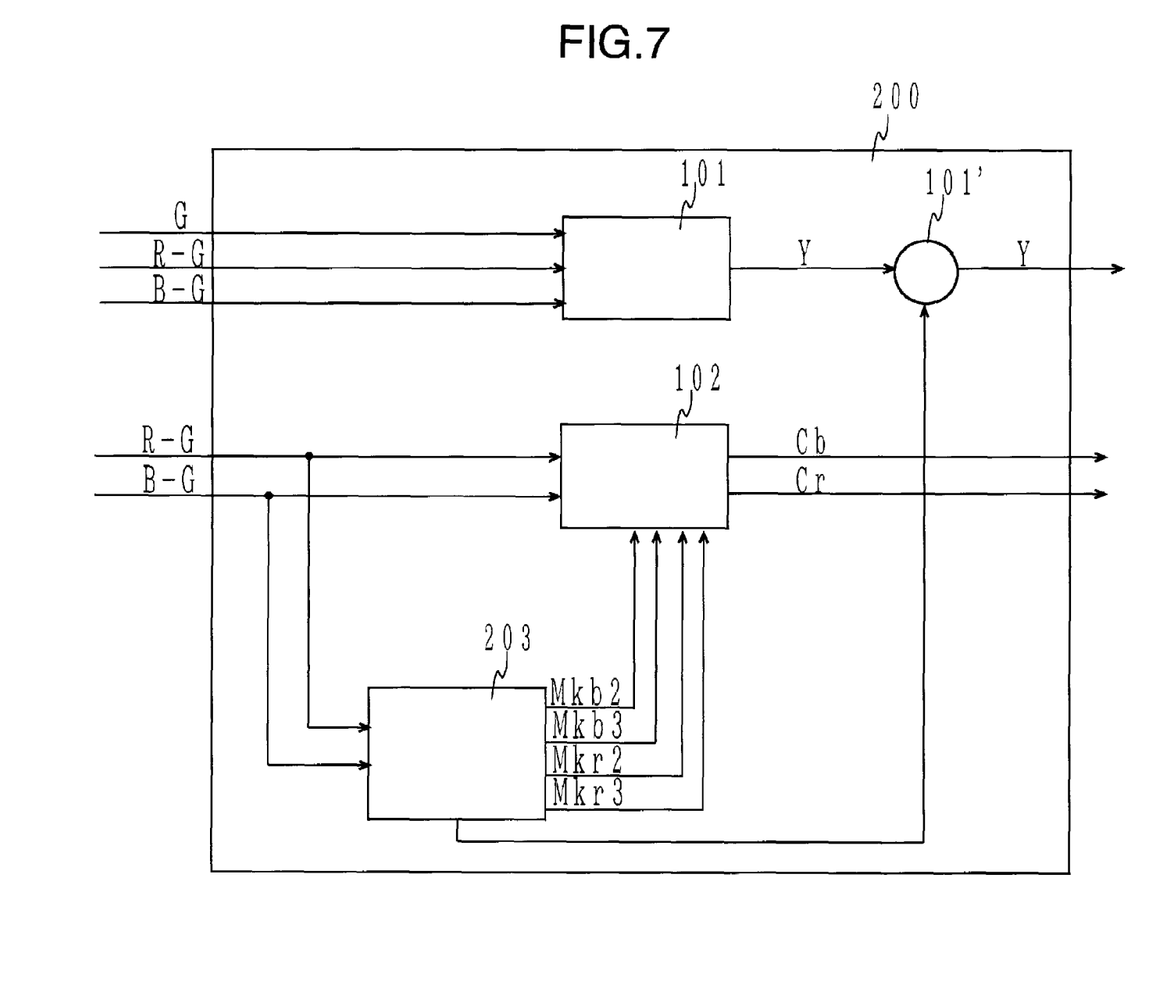
FIG. 7 is a circuit block diagram inside a color matrix circuit 200.
Figure 8:
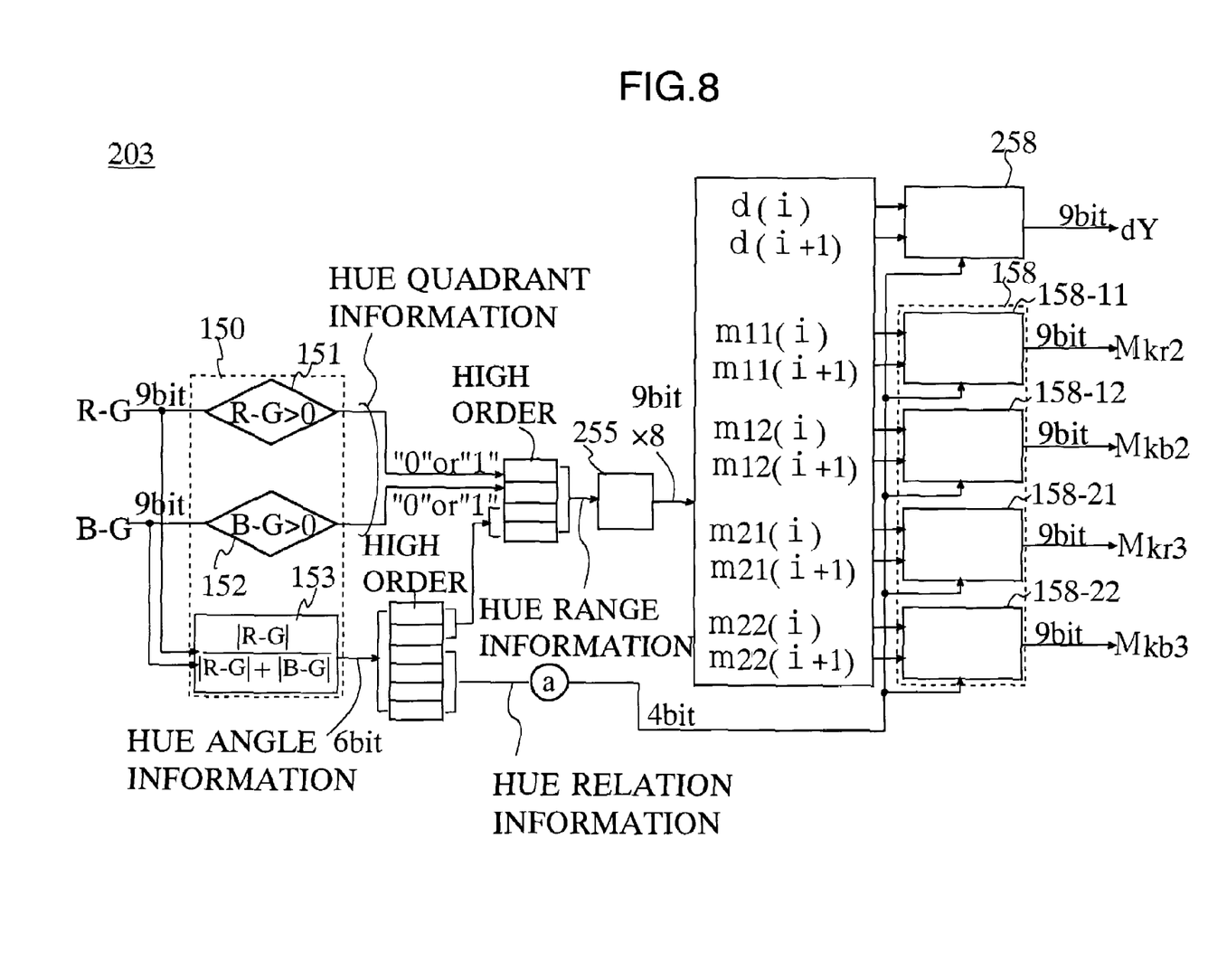
FIG. 8 is a circuit block diagram inside a parameter generating part 203.

What is different from the first embodiment will only be explained below and explanation on what is common to them will be omitted. In FIG. 7 and FIG. 8, the same numerals and symbols are used to designate the same components as those in FIG. 2 and FIG. 3. An electronic camera of this embodiment is the same as the electronic camera of the first embodiment shown in FIG. 1 except that it is provided with a color matrix circuit 200 which will be explained below instead of the color matrix circuit 29G.

FIG. 7 is a circuit block diagram inside the color matrix circuit 200.

The color matrix circuit 200 is provided with a matrix circuit 101 for generating a brightness signal Y and a matrix circuit 102 for generating color difference signals (Cb, Cr) similarly to the color matrix circuit 29G. The brightness signal Y obtained in this embodiment is, however, corrected by a correction circuit 101' provided inside the color matrix circuit 200. The correction circuit 101' is composed of an adder (or a subtracter or a multiplier) and so on. A correction value of this correction circuit 101' varies according to the hue of an input color signal. In order to realize this, a parameter generating part 203 (corresponding to an element setting part and a correction value setting part in claims) disposed in the color matrix circuit 200 of this embodiment generates a correction value dY as well as an element group (Mkr2, Mkb2, Mkr3, Mkb3).

FIG. 8 is a circuit block diagram inside the parameter generating part 203.

The parameter generating part 203 is the same as the parameter generating part 103 except that it is provided with a lookup table 255 instead of the lookup table 155 and additionally has an interpolation circuit 258 for calculating the correction value dY.

The lookup table 255 stores in advance optimum correction values d(0), . . . , d(15) (refer to FIG. 9) for the predetermined number of color reference signals respectively whose hues are different from one another, together with optimum element groups M(0), . . . , M(15).

Figure 9:
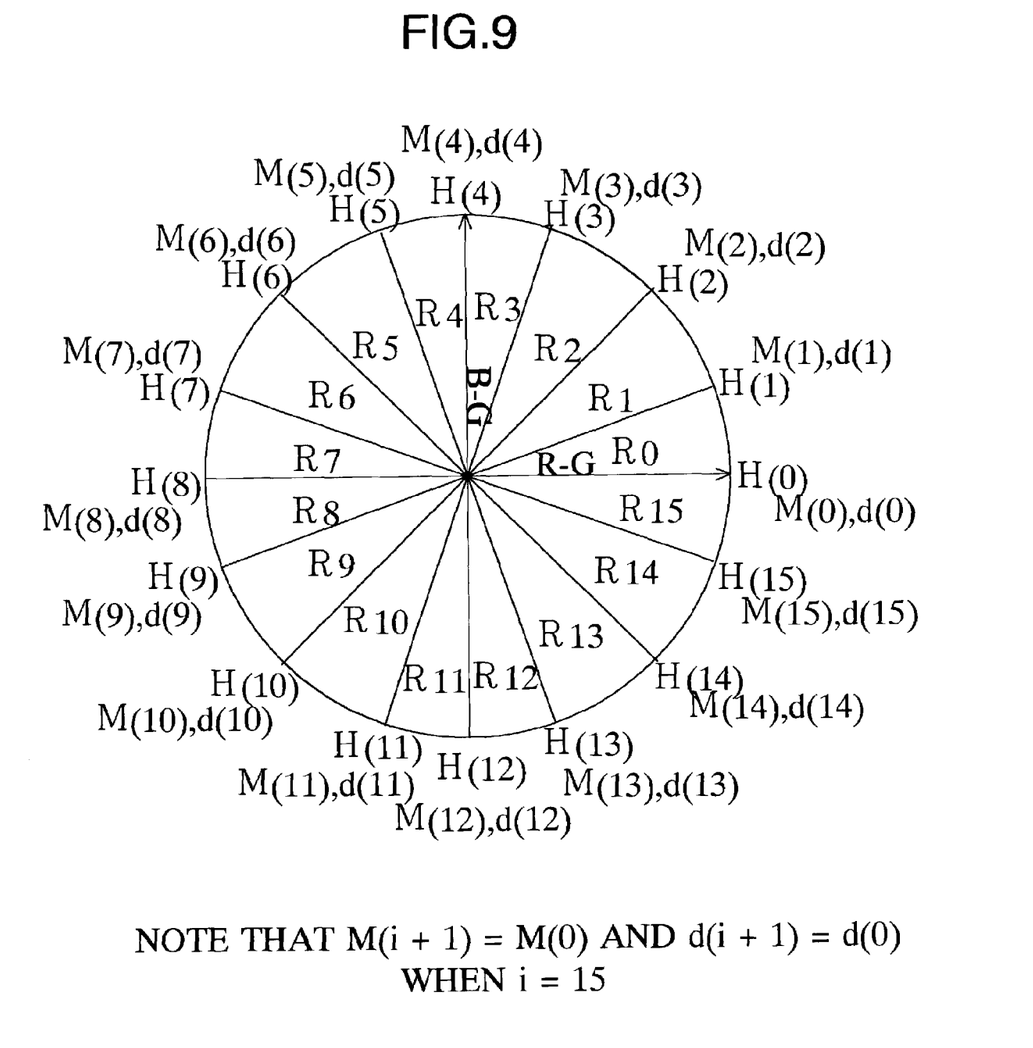
FIG. 9 is a view showing hues of respective color reference signals in a hue space and optimum element groups and optimum correction values of the respective color reference signals.

Each of the color correction values d(0), . . . , d(15) can be determined according to, for example, a user's preference and the like.

For example, when a manufacturer or a user of an electronic camera requests that the brightness of a color signal indicating the skin be higher than the brightness of color signals indicating other images, an optimum correction value d(k) for a color reference signal of the skin color is set at a larger value than optimum correction values d(k') for color reference signals of the other colors.

Figure 10:
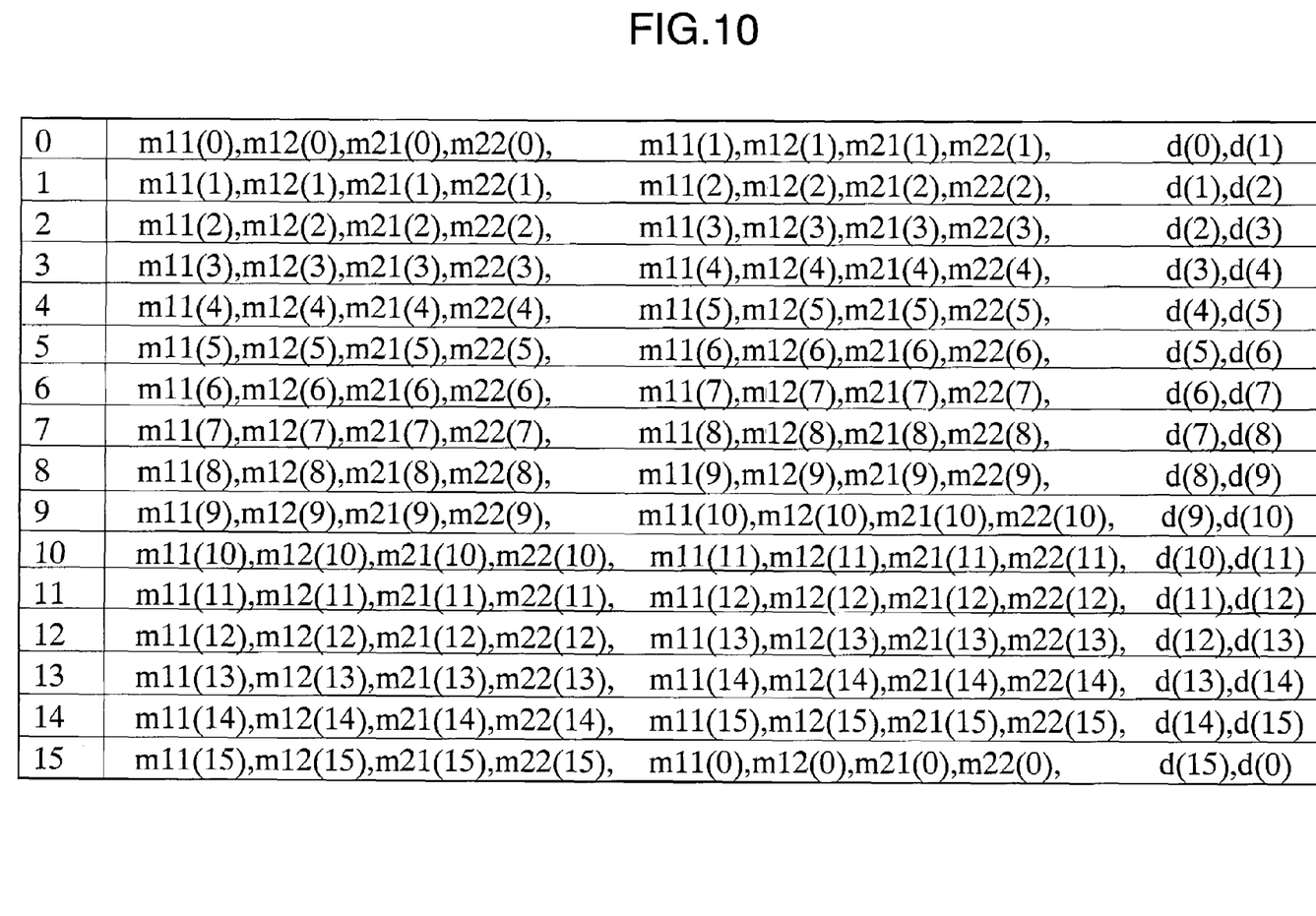
FIG. 10 is a view showing the contents of a lookup table 255.

FIG. 10 is a view showing the contents of the lookup table 255.

In the lookup table 255, the optimum element group M(i) (i=0, . . . , 15) and the optimum correction value d(i) (i=0, . . . , 15) correspond to hue range information (i) (i=0, . . . , 15).

Elements of the optimum element group M(i) and the optimum correction value d(i) and elements of its adjacent optimum element group M(i+1) and the optimum correction value d(i+1) correspond to each piece of the hue range information (i) (note that M(i+1)=M(0) and d(i+1)=d(0) when i=15).

When an interpolation circuit 258 recognizes the hue range information (i) (indicating a hue range Ri to which the input color signal belongs), it refers to the optimum element groups M(i), M(i+1) and the optimum correction values d(i), d(i+1) which are stored in the lookup table 255 and correspond to this hue range information (i).

Then, the interpolation circuit 258 performs interpolation computing similar to that by the interpolation circuit 158 of the first embodiment (based on the optimum element groups M(i), M(i+1)) based on the optimum correction values d(i), d(i+1). The correction value dY is calculated by the latter interpolation computing.

The interpolation circuit 258 has hue relation information (a) (low-order 4 bits of hue angle information) indicating the relation between the hue of the input color signal and two reference hues H(i), H(i+1) reflected in the interpolation computing. For example, the interpolation circuit 258 calculates a weighted average of d(i) and d(i+1) according to this hue relation information (a) as in the following expression (9).

$$dY = \frac{d(i) \times (16-a) + d(i+1) \times a}{16} \quad (9)$$

Consequently, a brightness correction characteristic curve approximates an optimum one in this embodiment. The above expression (9) is a linear interpolation expression which is the simplest among various kinds of interpolation computing. According to the interpolation circuit 258 which performs such interpolation computing, the brightness correction characteristic curve becomes a polygonal line.

According to the above-described embodiment, a high color reproducibility can surely be given to a brightness component of the color signal without any great increase in the circuit scale.

Third Embodiment

Figure 11:
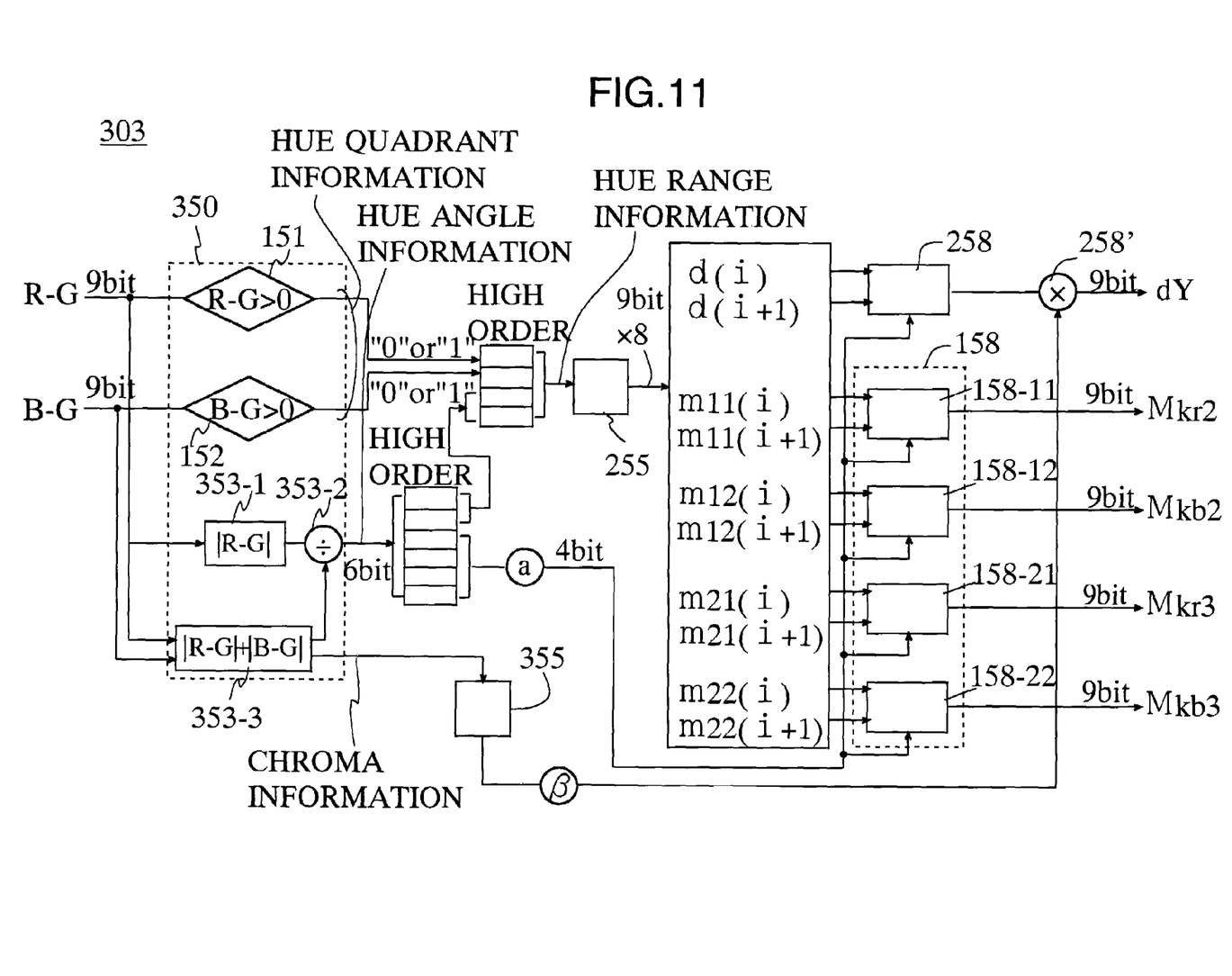
FIG. 11 is a circuit block diagram inside a parameter generating part 303.

A third embodiment of the present invention will be explained with reference to FIG. 11. What is different from the second embodiment will only be explained below and explanation on what is common to them will be omitted. In FIG. 11, the same numerals and symbols are used to designate the same components as those in FIG. 8.

FIG. 11 is a circuit block diagram inside a parameter generating part 303.

An electronic camera of this embodiment is the same as the electronic camera of the second embodiment except that it is provided with the parameter generating part 303 instead of the parameter generating part 203. The parameter generating part 303 is provided with an identification circuit 350, a lookup table 255, and interpolation circuits 158, 258 similarly to the parameter generating part 203.

In this embodiment a correction value dY, however, is determined not only by the hue of an input color signal but also by 'chroma' thereof. It is determined by a correction circuit 258' such as a multiplier (or a subtracter or an adder) provided inside this parameter generating part 303. In order to realize this, an identification circuit 350 generates hue quadrant information, hue angle information, information indicating the chroma of the input color signal (hereinafter, referred to as 'chroma information') based on the input color signal (R, G, B). The identification circuit 350 of this embodiment extracts the chroma information by, for example, the following expression (10).

$$|R-G|+|B-G| \quad (10)$$

This expression (10) is an approximate expression of an expression for calculating the chroma. This expression (10) is advantageous in that a great increase in the circuit scale of the parameter generating part 303 is not necessary since it does not include any multiplication/division (an expression for calculating an accurate chroma needs a square root and multiplication/division). Moreover, in the calculation of this expression (10), the value of the denominator in the expression (3) (the expression for generating the hue angle information) is usable as it is.

In FIG. 11, a circuit for calculating $|R-G|$ is denoted by the numeral $353_{-1}$, a circuit for calculating $|R-G|+|B-G|$ is denoted by the numeral $353_{-3}$, and a circuit for subtracting these values is denoted by the numeral $353_{-2}$. In other words, an output of the circuit $353_{-2}$ indicates the hue angle information and an output of the circuit $353_{-3}$ indicates the chroma information. In this embodiment, to vary a correction value β by the correction circuit 258 according to the chroma of the input color signal, correction values β appropriate for different chromas are prepared in advance in a lookup table 355 or the like.

Note that the number of the values prepared in the lookup table 355 (the circuit scale of the lookup table 355) is small since determined accuracy required for this correction value β(divergence from an optimum value) is not so high compared with determined accuracy required for the correction value dY and the elements Mkr2, . . . , Mkb3.

As described above, not only the hue but also the chroma of the input color signal are reflected in the correction value dY in this embodiment so that a higher color reproducibility is obtainable than in the second embodiment.

<Additional Remarks>

In each of the above-described embodiments, the number of the optimum element groups prepared in advance (the number of the optimum element groups and the number of the optimum correction values in the third embodiment) is '16', but the number is not limited to this and preferably, is set to a number according to the accuracy to be set which is required for the elements Mkr2, . . . , Mkb3, when necessary.

Further, FIG. 3, FIG. 8, and FIG. 11 show the examples of the bit numbers expressing the respective information (the hue quadrant information, the hue angle information, and the hue relation information), and in these examples the bit numbers expressing the input color signal and the output color signal are both '9'.

Further, in each of the embodiments explained above, the signal processing unit of the present invention is applied to the electronic camera, but it is applicable to other color image devices.

To utilize each of the above-described advantages, it is more preferable that the signal processing unit of the present invention is applied particularly to color image devices such as an electronic camera, a video camera, a portable printer, and so on for which downsizing, price reduction, and weight reduction are highly demanded.

The invention is not limited to the above embodiments and various modifications may be made without departing from the spirit and scope of the invention. Any improvement may be made in part or all of the components.

What is claimed is:

1. A signal processing unit comprising:
   a color transformation part for performing color transformation processing on an inputted color signal having plural components by multiplying the color signal by a transformation matrix; and
   an element setting part setting, every time a color signal is inputted, an element group of the transformation matrix to be used for the inputted color signal according to a hue of the inputted color signal, wherein
   said element setting part composes:
      an identification unit for identifying quadrant information indicating a quadrant to which the hue of the inputted color signal belongs and angle information indicating an angle within the quadrant of the hue;
      a storage unit storing in advance an optimum element group for each of a predetermined number of reference hue signals; and
      an interpolation unit for recognizing two pairs of optimum element groups for two of the reference hue signals close to the hue of the inputted color signal, in reference with said storage unit according to the quadrant information and the angle information, for performing interpolation computing with the two pairs of the recognized optimum element groups after performing weighting according to the angle information to the two pairs of optimum element groups, and for determining the element group to be set according to the hue of the color signal.

2. The signal processing unit according to claim 1, wherein:
   said storage unit has a lookup table; and
   an argument of the lookup table represents a color range to which the hue of the color signal belongs, and a function of the lookup table represents two pairs of optimum element groups for the two of reference hue signals located on borders of the color range.

3. The signal processing unit according to claim 1, wherein said element setting part arranges the predetermined number of reference hue signals with uneven intervals in a hue space.

* * * * *